(12) United States Patent
Ibarra

(10) Patent No.: US 7,207,576 B1
(45) Date of Patent: Apr. 24, 2007

(54) ICE CART

(76) Inventor: Jesus Ibarra, 3120 Gabriella St., West Covina, CA (US) 91792

( * ) Notice: Subject to any disclaimer, the term of this patent is extended or adjusted under 35 U.S.C. 154(b) by 208 days.

(21) Appl. No.: 11/125,515

(22) Filed: May 9, 2005

(51) Int. Cl.
*B62B 1/04* (2006.01)
(52) U.S. Cl. ............... 280/47.21; 280/43.1; 280/47.29; 280/30; 414/446
(58) Field of Classification Search ............ 280/47.21, 280/43.1, 47.29, 30; 414/446; 298/2
See application file for complete search history.

(56) References Cited

U.S. PATENT DOCUMENTS

| | | | | |
|---|---|---|---|---|
| 2,096,994 A | * | 10/1937 | Millen | ............... 280/38 |
| 4,349,210 A | * | 9/1982 | Rutt | ............... 280/47.21 |
| 4,724,661 A | * | 2/1988 | Blakeslee et al. | ............... 56/208 |
| 4,724,681 A | | 2/1988 | Bartholomew et al. | |
| 4,846,493 A | * | 7/1989 | Mason | ............... 280/641 |
| 5,810,543 A | * | 9/1998 | Hall | ............... 414/490 |

* cited by examiner

*Primary Examiner*—Christopher P. Ellis
*Assistant Examiner*—Cynthia F. Collado

(57) ABSTRACT

An apparatus that combines an ice chest or other similar storage device with a transportation apparatus for easily transporting the ice chest or other similar storage device. The transportation apparatus includes a plurality of straps and a handle that is attached to the plurality of straps. The transportation apparatus also includes a pair of wheels that are attached to the plurality of straps that allow the ice chest or other similar storage device to be carried similar to a piece of a luggage by merely grasping the handle and pulling the present invention while walking.

12 Claims, 2 Drawing Sheets

ICE CART

I. BACKGROUND OF THE INVENTION

The present invention relates to an apparatus that combines an ice chest or other similar storage device with a transportation apparatus for easily transporting the ice chest or other similar storage device.

II. DESCRIPTION OF THE PRIOR ART

U.S. Pat. No. 5,810,543, issued to Hall, discloses a conveyer device comprised of a two wheel carriage for moving heavy objects.

U.S. Pat. No. 4,846,493, issued to Mason, discloses a portable cooler with a pair of retractable wheels and an extendible handle assembly.

U.S. Pat. No. 4,724,681, issued to Bartholomew, discloses a portable wheeled cooler.

III. SUMMARY OF THE INVENTION

The present invention relates to an apparatus that combines an ice chest or other similar storage device with a transportation apparatus for easily transporting the ice chest or other similar storage device. The transportation apparatus includes a plurality of straps and a handle that is attached to the plurality of straps. The transportation apparatus also includes a pair of wheels that are attached to the plurality of straps that allow the ice chest or other similar storage device to be carried similar to a piece of a luggage by merely grasping the handle and pulling the present invention while walking.

There has thus been outlined, rather broadly, the more important features of a transportation apparatus for transporting an ice chest or other similar storage device in order that the detailed description thereof that follows may be better understood, and in order that the present contribution to the art may be better appreciated. There are additional features of the transportation apparatus for transporting an ice chest or other similar storage device that will be described hereinafter and which will form the subject matter of the claims appended hereto.

In this respect, before explaining at least one embodiment of the transportation apparatus for transporting an ice chest or other similar storage device in detail, it is to be understood that the transportation apparatus for transporting an ice chest or other similar storage device is not limited in its application to the details of construction and to the arrangements of the components set forth in the following description or illustrated in the drawings. The transportation apparatus for transporting an ice chest or other similar storage device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present transportation apparatus for transporting an ice chest or other similar storage device. It is important, therefore, that the claims be regarded as including such equivalent constructions insofar as they do not depart from the spirit and scope of the present invention.

It is one object of the present invention to provide a transportation apparatus for transporting an ice chest or other similar storage device that includes a wrapping member that keeps the juices of the food adjacent the food and allows smoke to enter through the holes to allow the smoke to flavor the food.

It is another object of the present invention to provide a transportation apparatus for transporting an ice chest or other similar storage device which has all of the advantages of the prior art and none of the disadvantages.

It is another object of the present invention to provide a transportation apparatus for transporting an ice chest or other similar storage device which may be easily and efficiently manufactured and marketed.

It is another object of the present invention to provide a transportation apparatus for transporting an ice chest or other similar storage device which is of durable and reliable construction.

It is yet another object of the present invention to provide a transportation apparatus for transporting an ice chest or other similar storage device which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
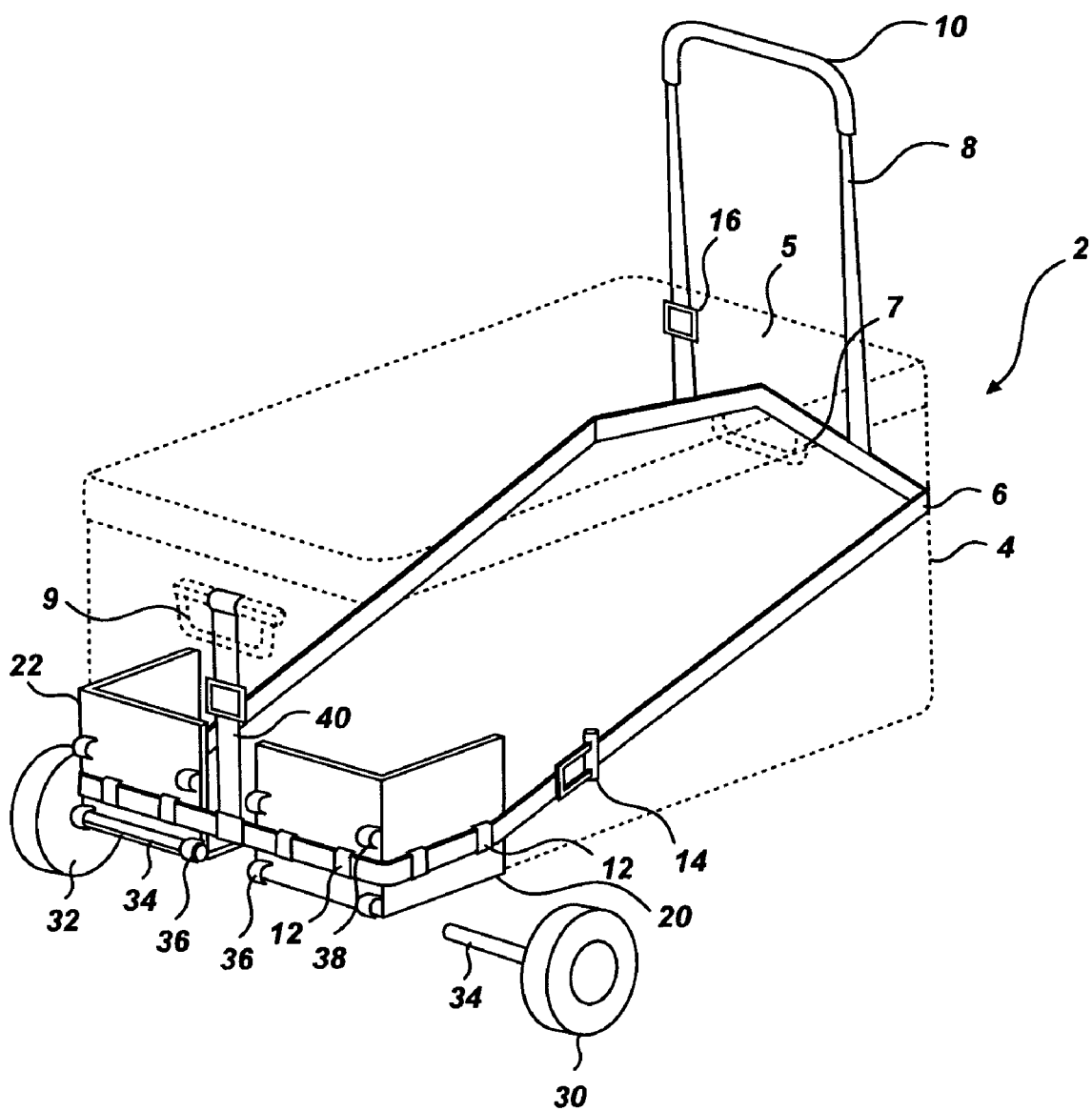
FIG. 1 is a perspective view of the transportation apparatus in combination with an ice chest.

FIG. 1 is a perspective view of the transportation apparatus 2 in combination with a food storage container 4. As previously explained, any type of storage container could be used in conjunction with the transportation apparatus, but the food storage container is preferably an ice chest. Another type of desired type of food storage container 4 that can be utilized is a cooler.

The food storage container 4 has two ends, a first end and a second end, and has two sides, a first side and a second side. Furthermore, the food storage container 4 has a top surface and a bottom surface. The food storage container 4 is preferably box-shaped with ninety-degree corners between ends, sides, and surfaces. The food storage container 4 has a lid 5 and a pair of handles 7 and 9 that are pre-existing and standard on practically all food storage containers.

Transportation apparatus 2 comprises a main strap 6, a handle strap 8, a handle 10, and a plurality of loops 12 through which the main strap 6 is inserted through. The main strap 6 itself has two ends, a first end and a second end, and is designed to completely encircle the food storage container 4. The first end and the second end of the main strap 6 are connected to one another by a ratchet 14, which allows an individual to tighten or loosen the main strap 6 as needed for the dimensions of a particular food storage container 4.

Handle strap 8 has two ends, a first end and a second end, with each of the ends being attached to the main strap 6 near the first end of the food storage container 4. Attached to the handle strap 8 is a handle 10, which can be moved about the handle strap 8 as needed. Handle strap 8 also has an adjustment clip 16 which allows the length of the handle strap 8 to be adjusted as needed.

A pair of back panels comprising a first back panel 20 and a second back panel 22 are attached to the food storage container 4 near the second end of the food storage container 4. The first back panel 20 covers a portion of the first side, the second end, and the bottom surface of the food storage container 4, while the second back panel 22 covers a portion of the second side, the second end, and the bottom surface of the food storage container 4.

A plurality of loops 12 are attached to each of the back panels 20 and 22. The plurality of loops 12 are designed to allow the main strap 6 to be inserted through so the main strap 6 will not "slip down" or fall out of contact with the food storage container 4. Ideally, there are anywhere between three to four loops 12 attached to each of the panels.

A pair of wheels comprising a first wheel 30 and a second wheel 32 are used with the transportation apparatus 2 carefully pull the food storage container 4 around as needed. Each wheel has its own axle 34, which can be inserted through either a lower pair of axle holders 36 or a higher pair of axle holders 38. Each panel has two pairs of axle holders, allowing an individual to mount both of the wheels in a lower position or both of the wheels in a higher position. If both of the wheels are mounted in a lower position through the lower pair of axle holders 36, the food storage container 4 could more easily be pulled over soft ground, such as sand or wet earth. If the ground is harder, however, then both of the wheels could be utilized in conjunction with the higher pair of axle holders 38.

In addition to the straps already discussed, the transportation apparatus 2 also has a rear strap 40, which has two ends, a first end and a second end. The first end of the rear strap 40 is attached to the main strap 6 in the middle of the second end of the food storage container 4, while the second end of the rear strap 40 is attached to the handle 9 of the food storage container 4.

Figure 2:
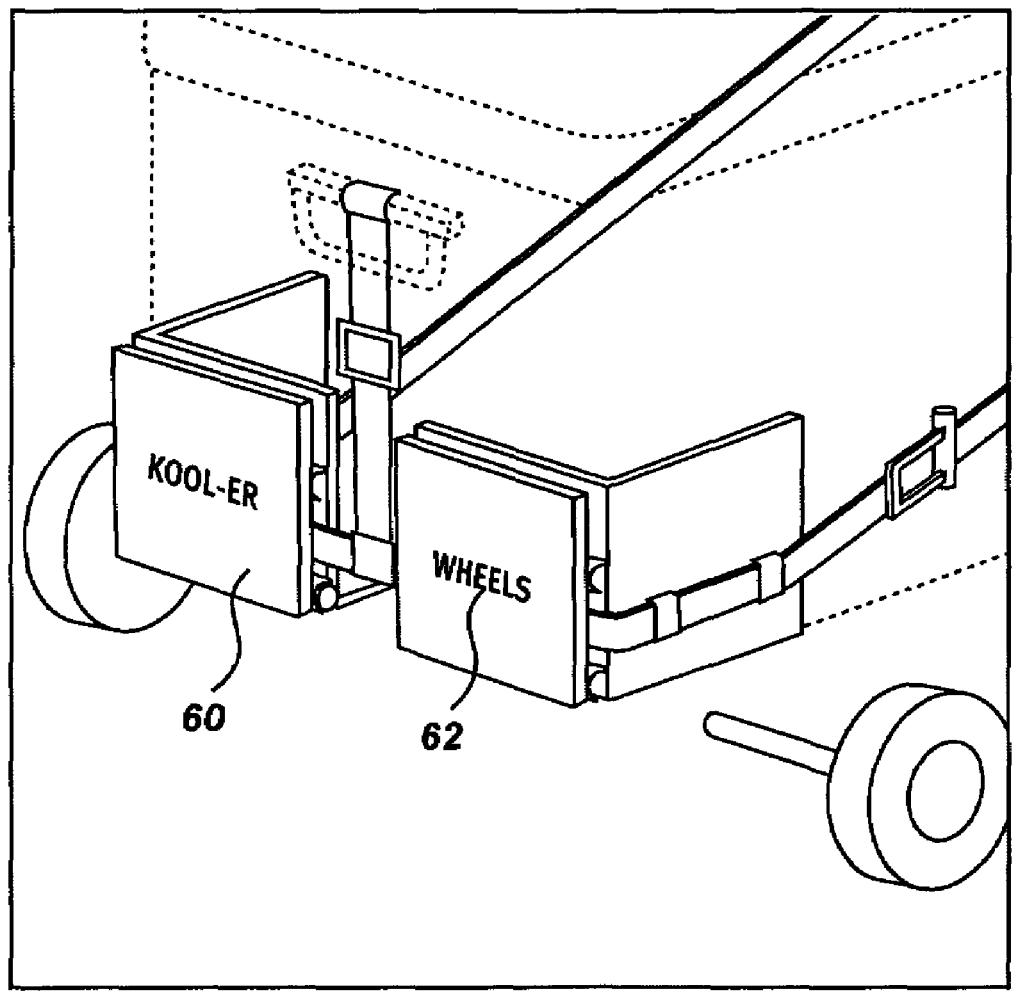
FIG. 2 is a close-up perspective view of the transportation apparatus in combination with an ice chest at the location where the back panels connect to the ice chest.

FIG. 2 is a close-up perspective view of the transportation apparatus in combination with an ice chest at the location where the back panels connect to the ice chest. FIG. 2 shows an option that is used with the present invention. One or two clip-on panels 60 can be placed over the portion of the panels 20 and 22 that are attached to the second end of the food storage container 4. The panels 60 can include writing 62 of various natures, such as sports team logos, advertising, various phrases, or other such material.

What I claim as my invention is:

1. A transportation system for transporting stored food comprising:
    (a) a food storage container, the food storage container having two two ends, a first end and a second end, the food storage container further having two sides, a first side and a second side, the food storage container having two surfaces comprising a top surface and a bottom surface, the food storage container preferably being box-shaped and having ninety-degree corners between adjacent ends, sides, and surfaces,
    (b) a lid attached to the food storage container,
    (c) a pair of handles comprising a first handle and a second handle, the pair of handles attached to the food storage container,
    (d) a main strap having two ends comprising a first end and a second end, the main strap placed to surround the ends and sides of the food storage container,
    (e) means for removably attaching the first end of the main strap to the second end of the main strap,
    (f) a handle strap having two ends, a first end and a second end, each of the ends being attached to the main strap near the first end of the food storage container,
    (g) a handle attached to the handle strap,
    (h) a pair of back panels comprising a first back panel and a second back panel, wherein the first back panel is placed against a portion of the first side of the food storage container, a portion of the second end of the food storage container, and a portion of the bottom surface of the food storage container, further wherein the second back panel is placed against a portion of the second side of the food storage container, a portion of the second end of the food storage container, and a portion of the bottom surface of the food storage container,
    (i) means for holding the main strap firmly against the pair of back panels,
    (j) a pair of wheels comprising a first wheel and a second wheel, each wheel having an attached axle, and
    (k) means for attaching the pair of wheels to the pair of back panels.

2. A transportation system for transporting stored food according to claim 1 wherein the means for removably attaching the first end of the main strap to the second end of the main strap further comprises a ratchet.

3. A transportation system for transporting stored food according to claim 2 wherein the means for holding the main strap firmly against the pair of back panels further comprises a plurality of loops, the loops being attached to each of the back panels.

4. A transportation system for transporting stored food according to claim 3 wherein each back panel has three to four attached loops.

5. A transportation system for transporting stored food according to claim 3 wherein the means for attaching the pair of wheels to the pair of back panels further comprises a plurality of pair of axle holders, wherein each of the back panels has at least one pair of axle holders.

6. A transportation system for transporting stored food according to claim 5 wherein each of the back panels has two pair of axle holders.

7. A transportation system for transporting stored food according to claim 5 wherein the transportation system further comprises a rear strap, the rear strap having two ends, a first end and a second end, the first end of the rear strap being attached to the main strap in the middle of the second end of the food storage container, the second end of the rear strap being attached to the second handle of the food storage container.

8. A transportation system for transporting stored food according to claim 7 wherein the transportation system further comprises at least one clip-on panel, the clip-on panel being removably attached to a back panel.

9. A transportation system for transporting stored food according to claim 8 wherein the panel includes writing.

10. A transportation system for transporting stored food according to claim 9 wherein the writing on the panel comprises a sports logo.

11. A transportation system for transporting stored food according to claim 9 wherein the writing on the panel comprises advertising.

12. A transportation system for transporting stored food according to claim 9 wherein the writing on the panel comprises a phrase.

\* \* \* \* \*